United States Patent [19]

Benninghoven et al.

[11] Patent Number: 4,468,468

[45] Date of Patent: Aug. 28, 1984

[54] PROCESS FOR THE SELECTIVE ANALYSIS OF INDIVIDUAL TRACE-LIKE COMPONENTS IN GASES AND LIQUID

[75] Inventors: Alfred Benninghoven, Muenster-Roxel; Günther Kämpf, Krefeld; Reimer Holm, Bergisch-Gladbach, all of Fed. Rep. of Germany

[73] Assignee: Bayer Aktiengesellschaft, Leverkusen, Fed. Rep. of Germany

[21] Appl. No.: 388,298

[22] Filed: Jun. 14, 1982

[30] Foreign Application Priority Data

Jun. 27, 1981 [DE] Fed. Rep. of Germany ....... 3125335

[51] Int. Cl.[3] ........................ G01N 24/08; H01J 49/26

[52] U.S. Cl. .................................... 436/173; 250/288; 436/178

[58] Field of Search ................ 250/288; 436/173, 177, 436/178, 524

[56] References Cited

U.S. PATENT DOCUMENTS

| | | | |
|---|---|---|---|
| 3,567,927 | 3/1971 | Barrington | 250/288 X |
| 4,023,929 | 5/1977 | Becker et al. | 436/178 X |
| 4,092,116 | 5/1978 | Giaever | 436/525 |
| 4,220,414 | 9/1980 | Barringer | 356/36 X |
| 4,330,208 | 5/1982 | Eloy | 250/288 X |
| 4,378,499 | 3/1983 | Spangler et al. | 250/288 X |

OTHER PUBLICATIONS

Posthumus et al., Analytical Chemistry, vol. 50, No. 7, Jun. 1978, pp. 985–991.

Smith et al., Analytical Chemistry, vol. 53, No. 11, Sep. 1981, pp. 1602–1611.

*Primary Examiner*—Arnold Turk

*Attorney, Agent, or Firm*—Sprung Horn Kramer & Woods

[57] ABSTRACT

The analysis comprises first enriching the component to be determined (target component) by contacting an non porous solid surface with the gas or the liquid to be investigated and depositing the target component from the gaseous or liquid phase onto the solid surface in the range of a monolayer preferably within the first monolayer. The deposition is effected by absorbing the target component either directly or in the form of a derivative product, which can then be detected by introducing the solid surface with the enriched target component into a mass spectrometer. Surface sensitive mass analyzers, such as secondary ion mass spectrometers or laser activated mass analyzers, have been proven successful.

10 Claims, 9 Drawing Figures

PROCESS FOR THE SELECTIVE ANALYSIS OF INDIVIDUAL TRACE-LIKE COMPONENTS IN GASES AND LIQUID

BACKGROUND OF THE INVENTION

The synthesis of new inorganic and organic substances, the question of their reaction and degradation products and the interest in the possible occurrence of trace-like impurities during the synthesis and/or reaction and/or degradation of these substances always impose new and increasingly stringent demands upon detection analysis. This applies in particular to products in the pharmaceutical, plant protection and dyestuff fields. At the same, the need to simplify and automate these detection techniques also arises. This applies in particular to the clinical sector, to medicaments and also to the analysis of harmful substances in insecticides, herbicides and fungicides and of environmentally polluting substances in effluents and waste gases. There is also interest in processes which can assist in the qualitative and quantitative detection of trace-like substances present in various concentrations in a wide range of other components, the nature of the substances to be detected or the associated group of substances being known per se. Problems of this nature frequently arise, for example, in clinical diagnosis or in the main laboratories of large chemical works.

To this end, high-quality separation and detection techniques have been and are being developed. Particular mention is made here of separation processes based on high-pressure liquid chromatography (HPLC) and thin-layer chromatography (TLC) and, generally in offline combination with such separating methods, mass spectrometers. In their case, the separate molecules are ionized by field desorption, by laser-stimulated ion desorption, by the californium technique, by chemical ionization and by ion activation (secondary ion mass spectrometry). A survey of the present state of the art was presented, for example, at the 1981 Pittsburgh Conference.

In addition, the known method of paper strip chromatography has already been combined with a mass spectrometer. Preliminary separation of the mixture of substances takes place in the strip of paper. The strip of paper is then introduced into a mass spectrometer and the patches associated with the individual substances are analyzed by SIMS (cf. R. J. Day et al, Anal. Chem. 52, No. 4, (1980), pages 557a–572a). One of the disadvantages of these methods lies in the fact that the preliminary separation step takes place chromatographically and requires long analysis times. In many cases, the preliminary separation step is made difficult or even impossible, above all when the individual components differ only slightly from one another in regard to their rate of migration. One feature common to all chromatographic separation techniques is that they are based on a volume effect in other words, the separation effect is based on transport phenomena taking place in a porous support layer several thousand molecule layers thick. In addition, relatively large quantities of substances have to be used on account of the large inner surface of the substrate.

Preliminary separation by means of a porous sintered element in combination with mass spectrometric detection is described in British Patent Specification No. 2,008,434. However, the process in question is confined to substances which can evaporate from the sintered element in the mass spectrometer. This is because the enriched substance in the sintered element is converted by heating into the gas phase and then ionized for example by electron bombardment or by field ionization. Direct ionization on the solid is not possible. Preliminary separation is based either on a chromatographic separation effect or is attributable to a form of fractional distillation within the sintered element. The main disadvantage of this process lies in the fact that thermally labile substances can undergo complete or partial decomposition during their thermal elimination from the sintered element with the result that defective or non-evaluatable mass spectra are obtained. This applies in particular to organic compounds of high molecular weight.

SUMMARY OF THE INVENTION

Accordingly, an object of the present invention is to provide, using mass spectrometry, an analysis process which, compared with known processes based on the combination of preliminary chromatographic separation with mass spectrometric detection, satisfies the following requirements:

(a) low substance consumption,
(b) high sensitivity,
(c) high analysis rate,
(d) substantially complete location of the component to be determined (hereinafter "target component" in the enriched layer during mass-spectrometric detection,
(e) versatility in regard to the components to be analyzed,
(f) reasonable outlay on apparatus.

According to the invention, this object is achieved in that a substantially flat solid non porous surface is brought into contact with the gas or liquid and the target component is deposited from the gaseous or liquid phase either directly or as a derivative onto the solid surface in the range of a monolayer, preferably in the first monolayer.

The expression "first monolayer" is understood to mean that molecule layer which is in direct contact with the original solid surface (substrate). A "range of a monolayer" by definition comprises several monolayers however only up to a layer thickness that the absorption characteristics of the adsorbent is still determined by the original substrate surface. This definition complies with the literature in this field (see f.i. Adsorption on Solids by V. Ponec et al, Butterworth Co. Ltd., London). The solid surfaces used must satisfy the requirements for a defined solid/liquid or solid/gaseous phase interface. This is only possible when a continuous uninterrupted surface is present, as is the case for example with metal or resin foil surfaces. By contrast, this requirement would not be satisfied by a porous material because, in that case, the gas or the liquid could disperse throughout the entire volume of material. However, it is only ever the uppermost molecule layers which are accessible to detection by mass spectrometry, when employing surface sensitive methods, such as secondary ion mass spectrometry. Accordingly, where a porous material is used for preliminary separation, most of the substance to be detected is buried in relatively low-lying pockets and channels and cannot be picked up by the mass spectrometer. In the process according to the invention, however, preliminary separation always takes place at the freely exposed liquid/solid or gas/-solid phase interface and the deposition of the target component takes place exclusively in the monolayer range. For this reason, this method of preliminary separation is referred to hereinafter in short as "planar separation".

An important step in obtaining effective preliminary separation is the preparation of the solid surface with a reagent which selectively binds the target component, either directly or as a derivative secondary product.

Another way is initially to precipitate the target component together with other components on the surface of the solid and then to extract the other components with a solvent. In the course of the preliminary separation step, therefore, the solid surface is subjected to a systematic pretreatment in order to deposit the target component or a high-density derivative characteristic of the target component on the surface of the solid. From the mass-spectrometric aspect, there is the further requirement that the deposited component or its derivative yields a characteristic peak or parent which is always to be fulfilled.

By laterally sub-dividing the solid surface into various zones prepared with various reagents, it is possible for various components to be enriched alongside one another on one and the same solid surface. By mechanical displacement of the substrate, the various surfaces may then be separately analyzed in the mass spectrometer.

To identify the enriched component, it is advantageous to use a mass-spectrometric technique which only covers the monolayer region, i.e. which works on a surface-specific basis. For this reason, the method of secondary ion mass spectrometry (SIMS) is particularly promising so far as the purpose in question here is concerned. Instead of SIMS the process according to the invention can be carried out also with a laser-activated micromass analyzer combined with a time of flight spectrometer (LAMMA). This modification is strictly speaking not to be regarded as a surface sensitive analysis method. However the high ion transmission of the time of flight spectrometer lends to an extremely high sensitivity of the instrument and therefore allows for a highly efficient detection of the target component, which is enriched in the range of a monolayer on the solid surface, which is most appropriately in this case the surface of a resin foil.

The process according to the invention would appear to be particularly promising in the field of medical diagnosis. To this end, the known test strip method for examining body fluids is modified to the extent that the test strip is substituted by the solid in the above sense and the latter is evaluated by mass spectrometry.

The test strip technique is understood to be the method of selective optical detection of individual substances by controlled chemical reaction with a chemical compound applied to the test strip in conjunction with a change in color. Test strips of this type are used, for example, for detecting sugar in human urine. Corresponding test strips and optical detectors are commercially available for the simultaneous optical analysis of several components, for example in the blood or in the urine.

The known optical test strip technique is modified to the extent that the special chemical compounds which selectively draw out individual substances from the predetermined mixture of substances either by adsorption or by chemical reaction (for example complexing in the case of chemical substances or enzymatic reactions in the case of biochemical substances or antibody/antigen binding in the case of biological substances), are firmly fixed to the surface of the object support of the mass spectrometer. There is no need for optical detection by color change because the individual substances are detected by mass spectrometry and not optically. This extends the possibilities of detecting selective chemical or biochemical reagents to a very considerable extent. Thus, controlled enzymatic reactions or controlled antibody/antigen reactions, both of which generally take place without any color change, may be used on a wide scale.

Further modifications and developments of the process according to the invention are described hereinafter.

The invention affords the following advantages:

(a) very low substance consumption (of the order of $10^{-10}$ to $10^{-14}$ g) because non-porous supports, such as for example metal strips or polymer films, rather than porous substances, such as silica gel, quartz or cellulose (paper) having a large inner surface or large pore volume, are used as the object support of the mass spectrometer;

(b) extremely high sensitivity and clear identifiability of the substance to be detected through its mass spectrum; detection limit approximately $10^{-13}$ g in the case of SIMS and between $10^{-18}$ and $10^{-20}$ g in the case if LAMMA; this enables the quantities of substance required to be greatly reduced and, with them, the quantities of reagents and solvents required for surface preparation;

(c) high analysis rate by comparison with the relatively long analysis times involved where mass spectrometry is coupled with liquid or paper chromatography;

(d) reduction in the outlay on experimental equipment by comparison with the combination of mass spectrometers with chromatographs;

(e) high spot resolution of individual analysis where planar separation is combined with LAMMA coupled with a lateral resolving power of approximately 1 μm; this spot analysis of high local resolution is a significant advantage in numerous applications;

(f) analysis of organic compounds which, hitherto, have not been detectable by mass spectrometry.

Whereas, in hitherto known processes, the chromatographic separation effect has been attributable to diffusion and transport processes and, because of this, requires long measuring times, the rate at which preliminary separation or enrichment takes place on the solid in the process according to the invention is determined solely by the kinetics of the absorption process responsible for fixing the target component to the surface of the solid. However, this process takes place in times which are shorter by orders of magnitude than the times required for chromatographic separation. Basically, the process according to the invention may always be successfully used to solve the problem of detecting one or more components known per se in a solution or mixture (gaseous or liquid), including in particular solutions of involatile organic substances which, hitherto, have been analyzed by means of a liquid chromatograph.

The enrichment in a monolayer at the surface of the solid provides for the application of any surface-analytical techniques which are suitable for the detection of elements and, to a limited extent, also of compounds. In addition to SIMS and LAMMA, the method of bombardment by fast neutral particles (known as fast atom bombardment, FAB) may also be used.

The invention is described in detail in the following with reference to Examples and the accompanying drawings, wherein:

DETAILED DESCRIPTION OF THE INVENTION

The first step of the process, i.e. the selective enrichment of the target component on the solid surface, is based on the precipitation of the target substance on the surface of the solid. A gas component may be precipitated from a gas, entering into an unbreakable bond with the surface. In the case of liquids, a liquid component or a dissolved component is precipitated and fixed to the surface. Commensurate with the significance which the analytical determination of liquids has now acquired, embodiments relating to solutions are discussed in the following.

In order to detect or quantitatively to determine a certain substance in a solution, the solution is brought into contact with a solid surface. Through its chemical composition, the solid surface reacts with the solution component to be detected in such a way that the solid surface undergoes a chemical modification specific to the substance. In the most simple case, the modification in question may be the direct fixing of the substance in question to the surface. However, secondary products of the reaction between the solid surface and the substance from the solution may also remain behind on the surface. Detection of the surface reaction products specific to the substance is preferably carried out in a SIMS or LAMMA.

The preparation of the test surface adapted to the substance or detection reaction in question is critical to this combination process. It may be carried out by various chemical and physical preparation techniques and combinations thereof.

A. Chemical preparation techniques:
   for example applying a reagent compound, at least in the form of a monolayer, which enters into an unbreakable bond with the substance to be analysed.

B. Physical preparation techniques, for example:
   vapour deposition,
   sputtering,
   CVD (chemical vapour deposition)
   implantation.

C. A combination of techniques from groups A and B.

One simple example is the detection of Cl in a solution. In this case, it is sufficient to use a clean Ag-foil as the reaction surface. Insoluble AgCl is formed in the Cl-containing solution, being detected by SIMS $Cl^-$ or $AgCl_2^-$.

The detection of other components, for example organic molecules, in body liquids requires correspondingly prepared surfaces which lead to substance-specific changes in the chemical composition of the surface and which can be detected by SIMS or LAMMA.

Figure 1:
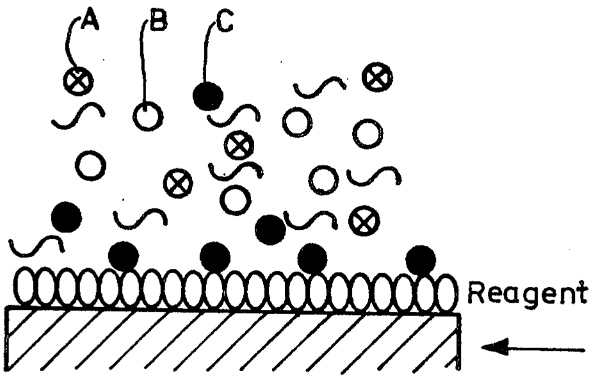
FIG. 1 diagrammatically illustrates the selective precipitation of a component C from a solution containing several components on a prepared solid surface.

FIG. 1 diagrammatically illustrates the detection of a substance in a solution through a surface reaction (addition reaction) detected by SIMS. Of the three assumed solution components A, B and C, only component C for example can be irreversibly fixed to the surface reagent R. Accordingly, C will be able to be detected in addition to R in a subsequent SIMS-analysis.

In addition to simple "addition reactions", it is also possible to detect a component through the results of other surface reactions. If it is assumed for example that component A reacts with the surface reagent R to form the product component P, distinctions have to be drawn between three steps, namely:

1. fixing of A;
2. disappearance of the reagent R;
3. production of a new product component P by reaction between the surface reagent R and the solution component A $$R+A \rightarrow P.$$

The surface may, of course, also be covered with complex reagents (for example mixtures) so that substance-specific reactions for various solution components may take place alongside one another on one and the same surface and may then be detected by common SIMS-analysis of that surface.

Figure 2:
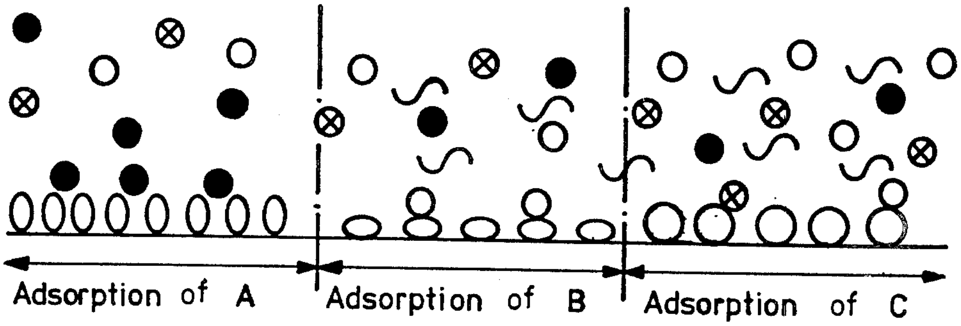
FIG. 2 diagrammatically illustrates the selective precipitation of various components A, B, C present in a solution on a solid surface divided up into differently prepared zones.

It is also possible to apply various reagents, spatially separated from one another to one and the same test surface. In that case, the surface regions with various treatments may be separately analyzed by SIMS-analysis optionally by mechanical displacement of the sample. This possibility is diagrammatically illustrated in FIG. 2.

Electrical constant or alternating fields may be used for initiating, strengthening or, generally, for controlling the component-specific surface reaction, particularly when the dissolved substances are present as ions or have a dipole moment. The effect of these fields may be enhanced by micro-roughness of the surface.

Similar effects may also be obtained by adding suitable additive reagents to the solution before the interaction with the solid surface.

In addition, an increase in the sensitivity of detection or simplification of the detection by SIMS of the change in the surface brought about by the detection reaction can be obtained by suitable chemical or physical post-preparation.

Similarly to SIMS, laser desorption (LAMMA operated as a monolayer process) may also be used for detecting the substance-specific surface changes.

A monolayer process is particularly favorable because it detects the compound as such, has extremely high sensitivity and only covers the uppermost monolayer. In addition to SIMS and LAMMA, it is also possible in principle to use other mass-spectrometric detection techniques such as for example, the $^{252}$californium technique and ionization by bombardment with neutral atoms.

Those methods in which the target component or its reaction product is detected intact are preferred.

Figure 3:
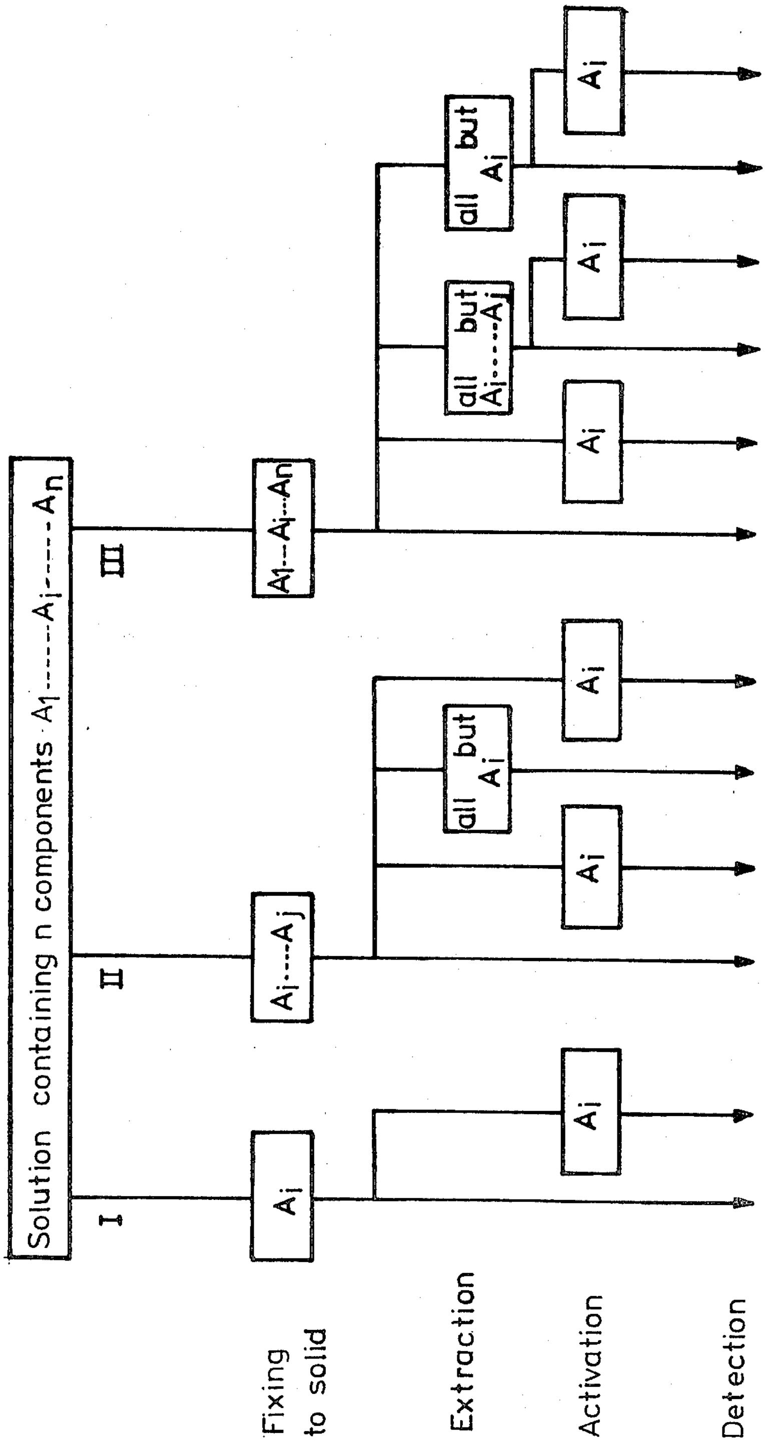
FIG. 3 diagrammatically illustrates the process steps on which the technique of planar separation is based.

The various possibilities of carrying out the planar separation technique are summarized in the following with reference to FIG. 3. The liquid to be analyzed (measuring liquid) or the gas to be analyzed (measuring gas) contains components $A_1 \ldots A_n$. The target component $A_i$. The first step is the fixing or absorption of the target component $A_i$ to the solid surface. The final objective is the quantitative, mass-spectrometric detection of the component $A_i$ enriched on the solid surface. In practice, the first step is carried out by immersing the solid with its test surface in the liquid to be analyzed or by exposing the solid with its test surface to the gas atmosphere to be analyzed. During this exposure, the target component $A_i$ is precipitated on the surface, optionally together with some other components $A_i \ldots A_j$ or even together with all the other components $A_1 \ldots A_n$. Now, there are basically two ways of achieving the relative enrichment on the solid surface:

1. The solid surface is prepared in such a way that, from the outset, it is only the target component $A_i$ which is precipitated; the other components are not absorbed. Accordingly, enrichment is achieved by the selective absorption of the target components $A_i$ in the extreme case. The solid with the enriched component $A_i$ is then introduced as the target into the mass spectrometer and $A_i$ is identified. This method is denoted I in FIG. 3.

2. In the other extreme case, all the components present $A_1 \ldots A_n$ are deposited on the optionally prepared surface. The relative enrichment of the target component $A_i$ is then carreid out in a following step in which all the components apart from the target component $A_i$ are removed again by treating the solid with a solvent or rinsing agent. This procedure is referred to hereinafter as extraction. It is followed by the mass-spectrometric detection of the component $A_i$ remaining on the surface of the solid, as described under 1 above.

Accordingly, this method (denoted III in FIG. 3) is based on the collective precipitation of all the components present on the solid surface and the subsequent isolation of the target component $A_i$ by treating the optionally pre-prepared surface with a solvent which dissolves out the other components fixed to the solid surface (extraction).

In addition to the extreme cases of the selective absorption of $A_i$ to the solid surface and the collective absorption of $A_1 \ldots A_n$, followed by the selective isolation of $A_i$, it is also possible for the components present, including the target component $A_i$, to be only partly absorbed on the surface. In graphical terms, this method lies between the two extreme cases I and III and is denoted II in FIG. 3. The mass spectrometric detection of $A_i$ is carried out either directly or after the introduction of an intermediate step in which all the components apart from $A_i$ are extracted in the manner described. As mentioned in reference to method III, it may even happen that the solvent only partly washes out the other unwanted components, leaving the target component $A_i$ on the surface together with some other components. In cases such as these, it is important to ensure that the other components do not interfere with the subsequent mass spectrometric detection of $A_i$.

So far as SIMS is concerned, it is known that the probability of ionization on the surface of the solid can be increased by doping with certain substances, for example alkali compounds. The component thus activated may then be detected with increased sensitivity. This step introduced immediately before mass spectrometric detection is referred to as "activation" in FIG. 3.

The effectiveness of planar separation by the methods illustrated in FIG. 3 depends critically upon the proper preparation of the solid surface which is subsequently introduced as the target into the mass spectrometer. Thus, where method I is used for enrichment, it is important that the surface reagent brings about substantially quantitative deposition of the target component $A_i$, the other components remaining in solution. By contrast, the crucial aspect of the pretreatment where enrichmet is carried out by method II is the extraction of the unwanted components with a suitable solvent. To solve this problem, it is possible to use the elution methods applied in chromatography, optionally in modified form. The fixing of a component to the solid surface may be carried out as follows:

1. by physical adsorption (Van der Waals-forces or electrostatic forces in the case of ionic fixing),
2. by chemisorption, for example the formation of complexes together with the surface reagent,
3. by enzymatic binding in the case of biochemical substances,
4. by antibody/antigen binding in the case of biological substances.

In all the fixing methods apart from 1., the precipitated component reacts with the surface reagent in such a way that a characteristic derivative is formed and is subsequently identified by mass spectrometry, either directly or after further modification (where extraction and/or activation are/is intended). The surface reagent and the absorbed component undergo structural modification in every case with the exception of physical adsorption.

Figure 4:
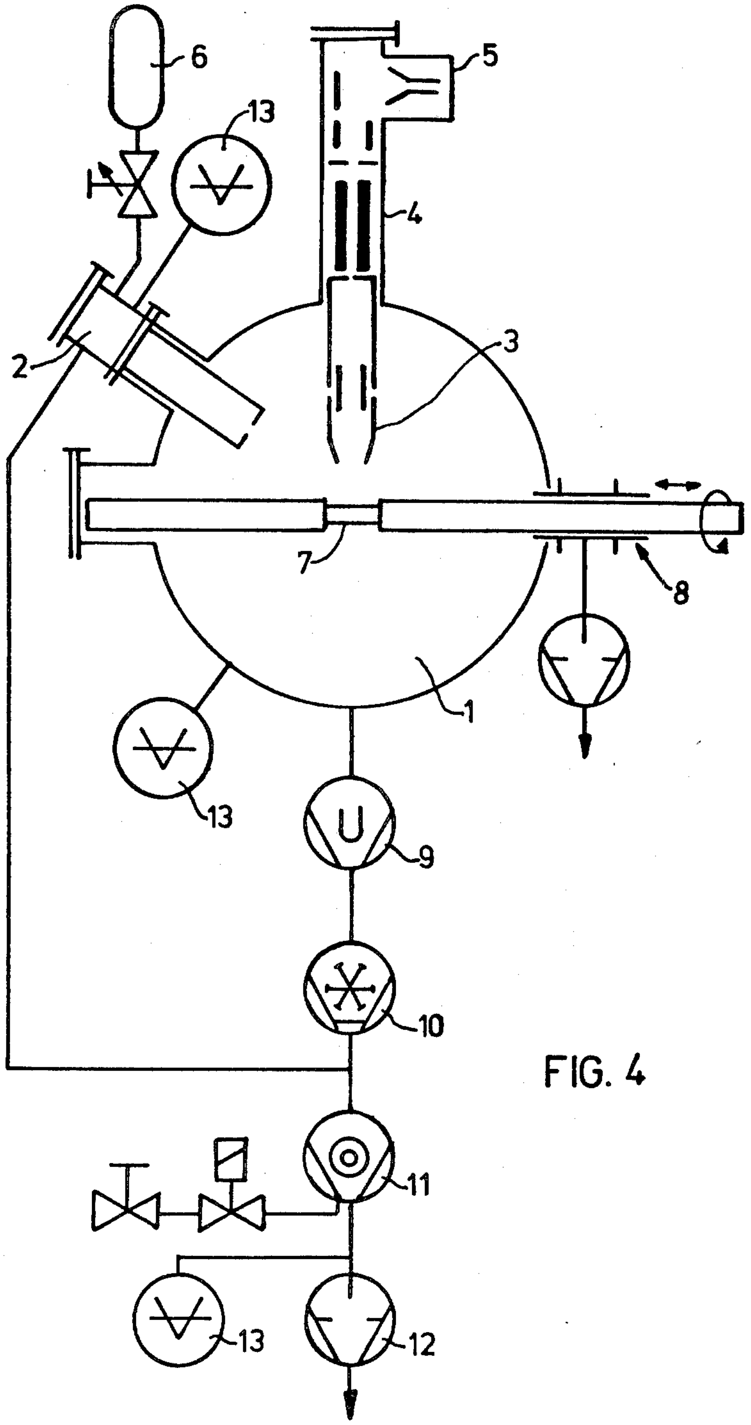
FIG. 4 shows the basic structure of a secondary ion mass spectrometer (SIMS) for carrying out the process according to the invention.

Two apparatus for carrying out the process according to the invention are described in the following. The secondary ion mass spectrometer diagrammatically illustrated in FIG. 4 consists essentially of the mass spectrometer compartment 1 with a primary ion source 2, an ion lens 3 and a quadrupole mass filter 4 with a detector 5. The ion source 2 is connected to an argon cylinder 6. The solid surface used as the target 7, with the enriched component situated thereion, is introduced into the mass spectrometer compartment 1 through a gate system 8. The vacuum supply system for the mass spectrometer consists of a titanium sublimation pump 9, a cryo pump 10, a turbomolecular pump 11 and a rotary pump 12. The vacuum is monitored by means of ionization manometers 13. The ion source 2 provides for the generation of primary ions (argon ions) having an energy of several keV and a current density of from $10^{-9}$ to $10^{-8}$ A/cm$^2$. The measurements take place in a high vacuum at $10^{-5}$ torr.

Figure 5:
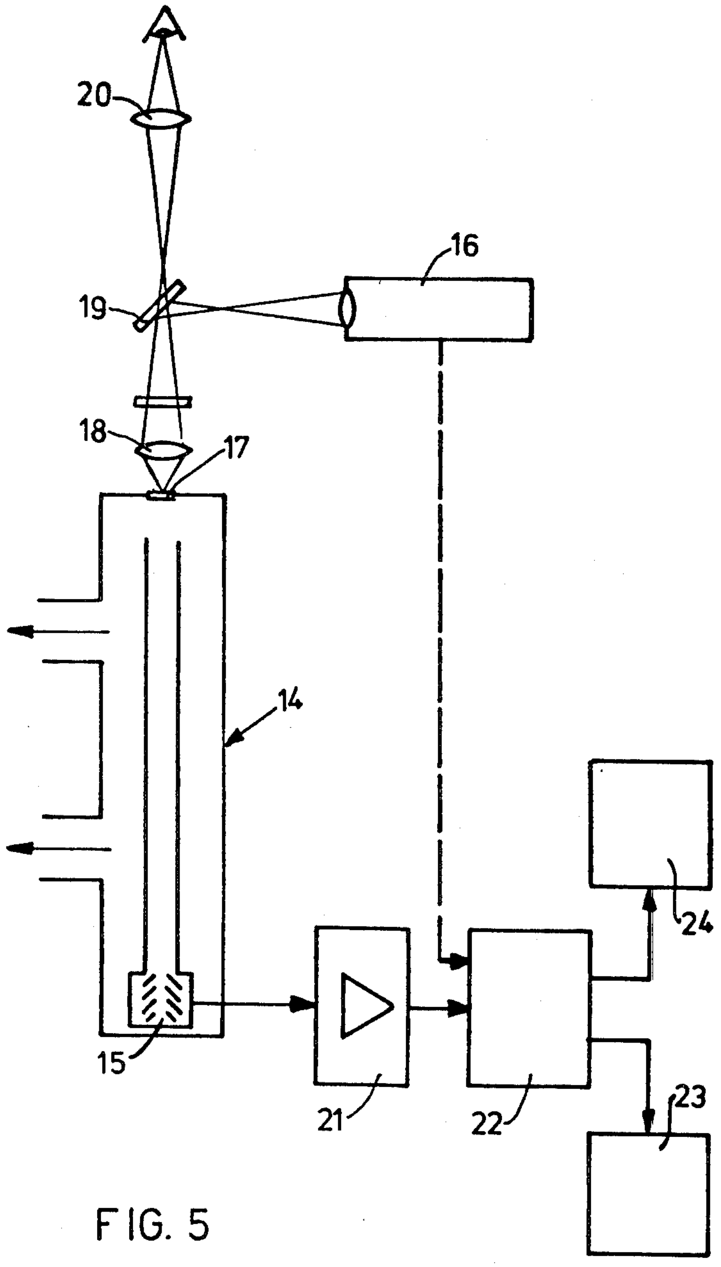
FIG. 5 shows the basic structure of a laser-activated micromass analyzer (LAMMA) for carrying out the process according to the invention.

The second apparatus, which was used in combination with the planar separation technique, is a laser-activated micro-mass analyzer (LAMMA). In this connection, further developments on apparatus have been carried out, opening up entirely new potential applications. The LAMMA-apparatus diagrammatically illustrated in FIG. 5 consists essentially of a flight-time mass spectrometer 14 with a detector 15 and a pulsed high-energy laser 16 for evaporating and ionising the sample 17. The laser beam is focused onto the sample 17 by means of a lens 18. The position of the specimen in the mass spectrometer compartment relative to the laser beam may be visually checked and readjusted as required by means of a mirror 19 and an eyepiece 20.

The laser 16 generates a very brief light pulse (laser flash) which instantly evaporates and largely ionizes the sample mounted on a suitable specimen holder. The ions formed are picked up by the flight-time mass spectrometer 14 and are separated on the principle of transit time measurement. The ions arriving at the multiplier 15 generate an electrical signal which, after amplification (21), is delivered to a transient recorder 22 and is then displayed on a recorder 23 and an oscillograph 24. The transient drecorder 22 is triggered by the laser. To generate the necessary vacuum, the flight-time mass spectrometer 14 is connected to suitable vacuum pumps.

Figure 6:
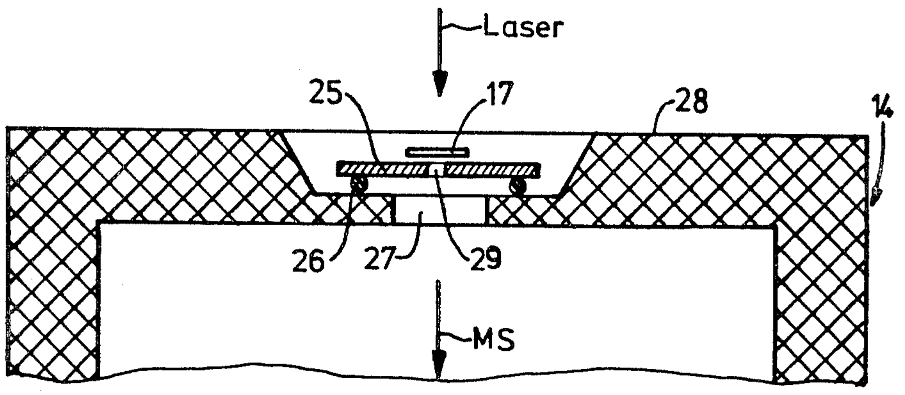
FIG. 6 is an elevation showing the sample holder of the LAMMA apparatus shown in FIG. 5.
Figure 7:
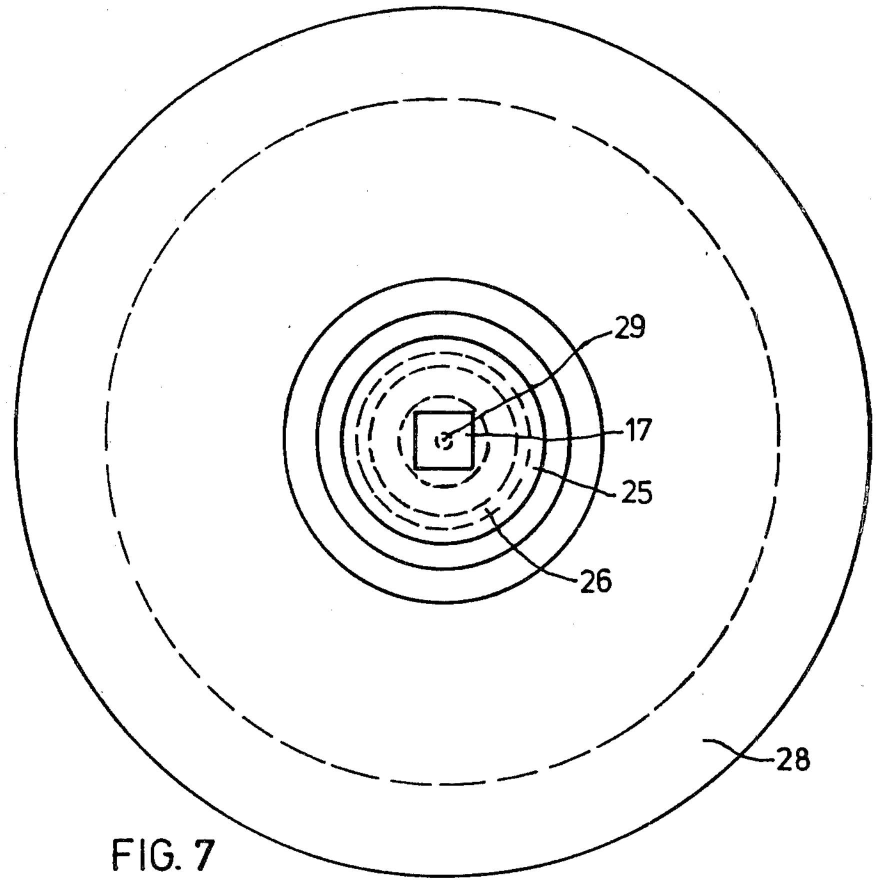
FIG. 7 is a plan view of the same sample holder.

In conventional LAMMA-apparatus, the sample 17 is arranged on a thin polymeric carrier film and is situated in the high vacuum of the mass spectrometer. The laser beam is focused onto the sample through glass plate arranged on the mass spectrometer 14 and sealing the mass spectrometer (high vacuum) from the laser (atmosphere). It has now been found that the thin polymeric carrier film (approximately 0.1 μm thick) may serve directly as a separating film between the optical microscope compartment (air) and the mass spectrometer (high vacuum) and that this carrier film is not broken up even by repeated penetration of the laser beam, the vacuum required for operating the mass spectrometer also being unaffected even by several such perforations (approximately 2 μm in diameter). This fact enables the carrier film to be arranged with the sample on the outside of the mass spectrometer under atmospheric pressure or in an inert gas atmosphere. The laser flash then ensures that the sample situated on the film is evaporated in the mass spectrometer compartment by a hole simultaneously formed in the film. A correspondingly modified sample holder is shown in FIGS. 6 and 7.

The sample 17 is situated on the sample holder 25 which is centrally arranged by means of the sealing ring 26 over an opening 27 in the outer wall 28 of the mass spectrometer 14. Diaphragms of the type used, for example, in electron microscopes may be used as the sample holders 25. The diaphragms in question are solid metal foils, for example of platinum, silver, steel etc., which are approximately 1 mm thick and which have one or more holes 29 ranging from 10 to 100 μm in diameter. There are also metal foils which have one relatively large central hole covered by a metal gauze having a mesh width of from 20 to 100 μm.

Thin polymer films are stretched across these metal diaphragms, serving on the one hand as a vacuum seal and, on the other hand, as non-porous carriers for the substances to be investigated. To achieve the enrichment of the target component, these films are covered with chemically or biochemically selective reagents in the manner already described on pages 12 to 15. These reagents may also be contained in the film itself.

The constituent material of the carrier film may consist, for example, of nitrocellulose lacquer, celluloid lacquer, or Formvar or the like. These materials are also used as carrier films in electron microscopes. The carrier film is applied to the sample holder 25 by lowering a very thin film produced by spreading nitrocellulose lacquer, celluloid lacquer or Formvar or the like over a water surface, for example, in a separation funnel, or by forming the carrier film by spreading the lacquer over a smooth support, for example a glass plate, detaching the film, for example by gradual immersion in water, and transferring the carrier film to the sample holder 25.

Proof of the surprisingly high vacuum tightness of the carrier films even after perforation through repeated penetration of the laser beam, was supplied by photographs taken with an electron microscope. These photographs show that the laser beam burns substantially circular holes 1 to 2 μm in diameter in the 0.1 μm thick carrier film. It was possible by a series of measurements to confirm that the operational capability of the LAMMA was not affected, even after repeated laser flashes. The leaks forming as a result of the flashes would appear to be so small that the vacuum prevailing in the apparatus is not impaired. Otherwise, it would of course also be possible for any hole formed in the carrier film by penetration of the laser beam to be immediately closed again by spotting with a lacquer (for example nitrocellulose lacquer).

Difficulties are involved in depositing both the reagent substance and also the substance to be detected onto small predesignated areas, for example circular area 10 to 50 μm in diameter, on the carrier film. However, this problem may be solved by locally hydrophilizing the basically hydrophobic carrier film by irradiation with electrons, by exposure to a suitably concentrated electron beam or by treatment in an a.c.- or d.c.-operated gas discharge with suitable masks having circular apertures of suitable size placed in between. The effect of this hydrophilizing treatment is that, both where the reagents are applied from a solution or from a suspension and where the substances to be detected are deposited from the solution or suspension, they are only deposited in the small, preselected area prepared by hydrophilization.

EXAMPLES ILLUSTRATING THE SELECTIVE DEPOSITION AND SUBSEQUENT SIMS-DETECTION OF DISSOLVED CHEMICAL COMPOUNDS ON PLANAR SOLID SURFACES

The substances used in the Examples are summarized in the accompanying Table. Of the selective precipitation methods illustrated in FIG. 3, the method which begins with deposition of all the components present in the solution (method III) was adopted:

By immersing a suitable flat target in the corresponding solution, all the dissolved substances ($A_1 \ldots A_n$) were deposited on the surface. During the subsequent rinsing operation in distilled water (selective extraction), all the compounds applied are removed from the surface except for one ($A_i$). After this extraction or rinsing step, the sole component ($A_i$) remaining on the surface from the mixture ($A_1 \ldots A_n$) is detected via a characteristic secondary ion $(M_i+A_g)^+$ or $(M_i-H)^-$.

1. Sample composition

The planar separation technique is explained in the following with reference to two different solutions of organic compounds in $H_2O$:

Sample A: 2-component solution

The starting solution contains $1.5 \cdot 10^{-3}$ mole/l of each of the following components in $H_2O$: mephobarbital and sulfanilamide.

Sample B: 4-component solution

The starting solution contains $0.75 \cdot 10^{-3}$ mole/l of each of the following components in $H_2O$: alanine, phenylalanine, adenine, sulfanilamide.

2. Separation and detection surface (target)

A 0.1 mm thick silver foil measuring 10×20 mm is used as the separation and detection surface. Before immersion in the solution to be analyzed, the silver foil was immersed for 3 minutes in $HNO_3$ (20%) and then rinsed three times with distilled water in an ultrasonic bath for the purpose of cleaning and roughening.

3. Application of the components $A_1 \ldots A_n$ dissolved in the sample

The application of all the components $A_1 \ldots A_n$ dissolved in the sample was carried out by immersing the pretreated silver foil in the solution for about 2 to 3 minutes. The liquid was kept in a state of constant motion relative to the Ag surface. The target was then removed from the solution, excess solvent was removed from the surface by shaking and the target subsequently dried in air. The so-called "exposed but not rinsed" target was subjected to SIMS-analysis in this state.

4. Selective extraction

In all the Examples, selective extraction was carried out with water as the solvent. To this end, the target charged with the components of the solution was immersed three times in succession for about 1 minute in distilled water in an ultrasonic bath. The target was then dried in air and, in this form, represented the sample in the "exposed and subsequently rinsed" state.

5. SIMS-analysis

The SIMS-spectra of the individual compounds used are known from corresponding preliminary tests. The parent ions $(M_iA_g)^+$ or $(M_i-H)^-$ were used for detecting the compounds present on the particular surfaces (cf Table).

After the dried targets had been introduced over a period of about 1 minute through a high-speed gate system, the spectrum cutouts shown in the Figures were obtained in measuring times of about 2 minutes. To this end, the target was bombarded with $Ar^+$-ions having an energy of 3 keV and a current intensity of $2.10^{-10}$ A/0.1 cm$^2$. Mass analysis of the positive and negative secondary ions was carried out with a quadrupole mass spectrometer and was followed by individual ion detection. The known total action cross section for the damage by ion bombardment amounts to some $10^{-14}$ cm$^2$ for all the compounds present in this series of Examples. For a scan rate of approximately 1 amu/s, therefore, it was ensured that no troublesome change in the surface concentration of the compounds being analyzed occured during the analysis time. The time constant of the recorder amounted to ¼ s.

Figure 8A:
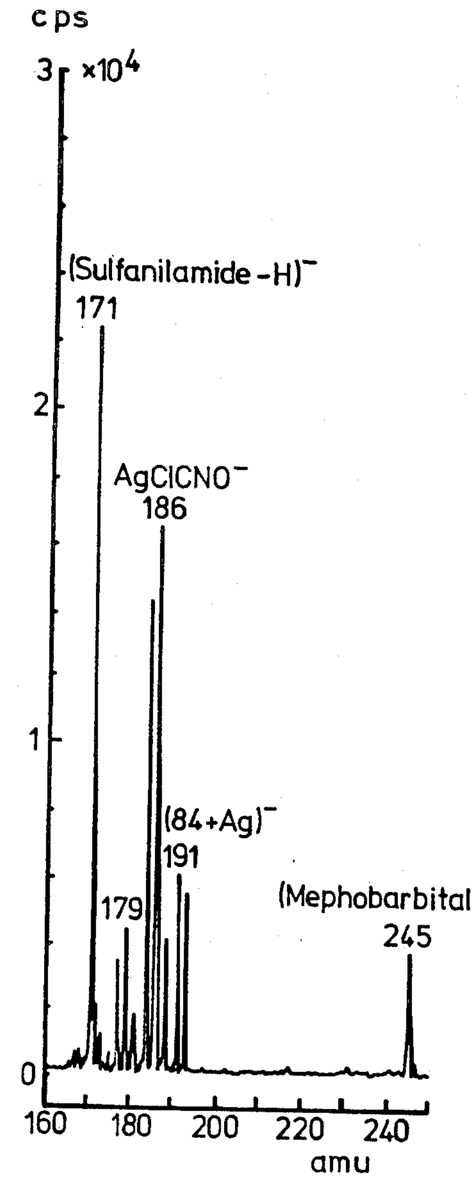
FIGS. 8*a–b* and 9*a–b* show the mass spectra obtained in the Analysis Examples.
Figure 8B:
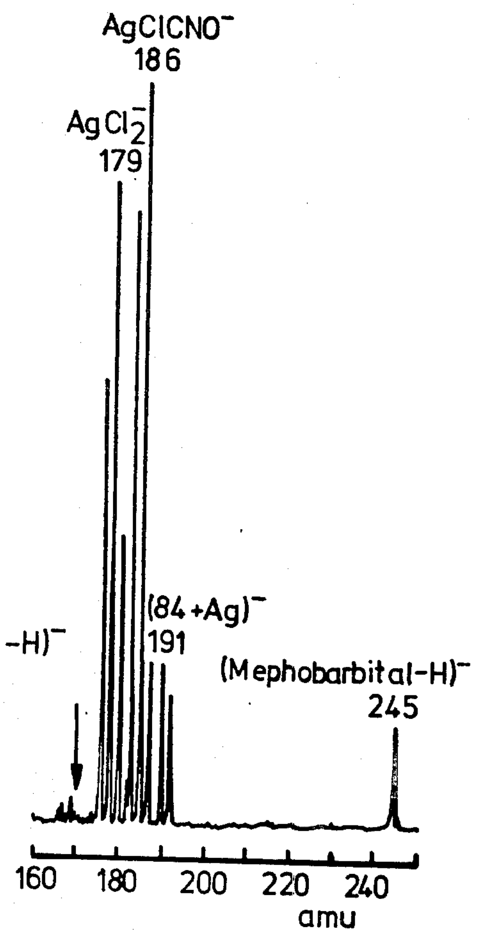

6. Results 6.1 2-component sample (FIGS. 8*a* and 8*b*)

In the case of this sample, the organic compounds present on the surface from the original solution were detected via the secondary ions $(M_i-H)^-$ in the negative secondary ion spectrum. The spectrum of the exposed but not rinsed sample in FIG. 8*a* shows sulfanilamide and mephobarbital through the secondary ions $(M_i-H)^-$. The different secondary ion intensities observed in the SIMS-spectrum despite the same initial concentrations of these compounds in the solution are essentially attributable to different ion yields of these two compounds. In addition, the spectrum shows secondary ions which were formed through the interaction of solvent impurities with the silver surface. However, they do not interfere in any way with analysis of the actual sample substances.

After rinsing, the sulfanilamide signal has almost completely disappeared (cf. the arrow in FIG. 8*b*) whereas the secondary ion intensity for mephobarbital has remained constant. This means that the surface bond which the sulfanilamide formed with the silver was broken by a selective extraction process whereas the mephobarbital bond to the silver surface cannot be broken by water.

Figure 9A:
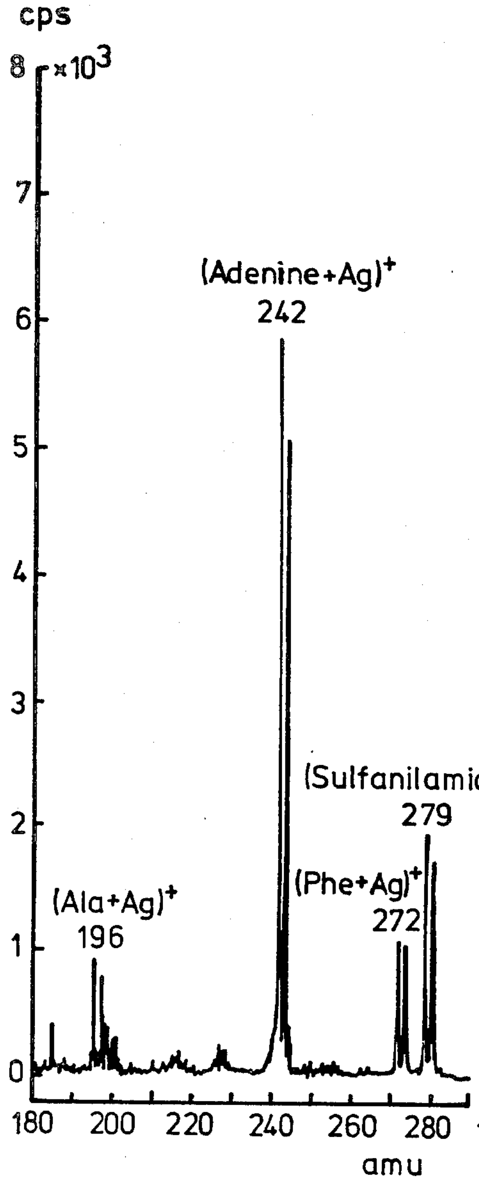
Figure 9B:
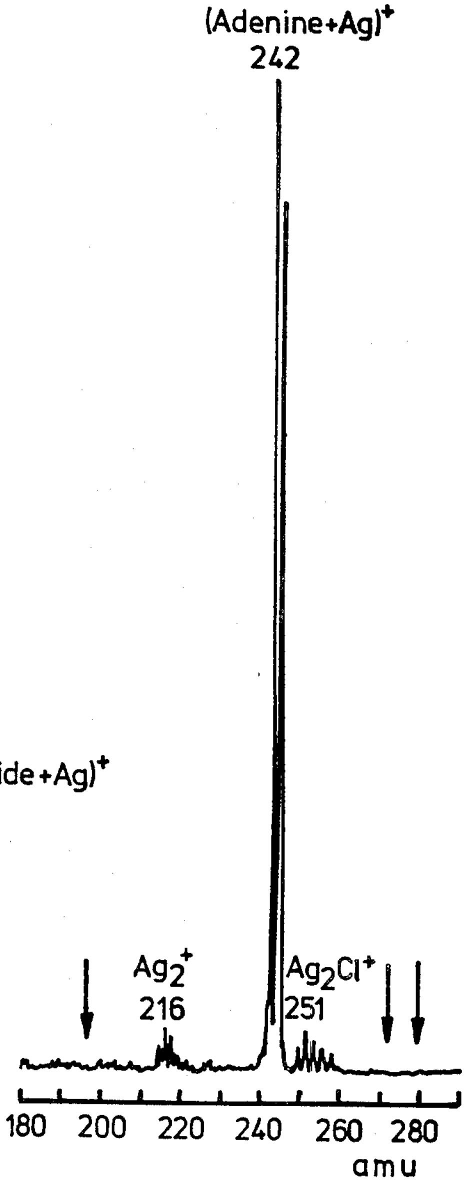

6.2 4-component sample (FIGS. 9*a* and 9*b*)

In the case of this sample, the compounds deposited on the surface from the solution were detected through the Ag-cationized molecule ions $(M_i+Ag)^+$ in the positive secondary ion spectrum.

In the case of the unrinsed, exposed sample, all four compounds (alanine, adenine, phenylalanine and sulfanilamide) are directly detected, as shown in FIG. 9*a*. In this case, too, the different intensities are attributable to different ionization probability factors of the corresponding surface complexes. After rinsing of this sample in distilled water, only one of the four compounds originally deposited, namely the adenine, can be detected, as shown in FIG. 9*b*. The bonds which the alanine, the phenylalanine and the sulfanilamide form with the silver surface were broken during rinsing in $H_2O$ and the corresponding substances removed from the surface.

During the rinsing process, small quantities of chlorine from the distilled water were deposited on the silver $(Ag_2Cl^+)$.

| Substance | M | Structure | Ions used for SIMS detection |
|---|---|---|---|
| Alanine | 89 | $CH_3CH(NH_2)COOH$ | $(M + Ag)^+$ |
| Adenine | 135 | 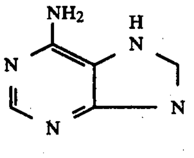 | $(M + Ag)^+$ |
| phenylalanine | 165 | 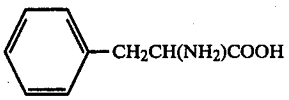  | $(M + Ag)^+$ |
| sulfanilamide | 172 | 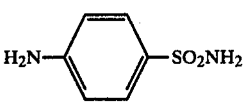  | $(M + Ag)^+(M - H)^-$ |

-continued

| Substance | M | Structure | Ions used for SIMS detection |
|---|---|---|---|
| mephobarbital | 246 | 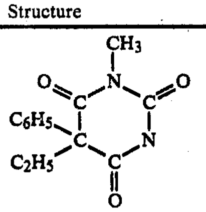 | $(M-H)^-$ |

We claim:

1. In a process for analytically determining a given component present in a fluid, wherein the given component is deposited on a target and subsequently identified in a mass spectrometer, the improvement comprising: enriching the given component on the target relative to other components in the fluid within the range of monolayer by providing the target with a substantially flat, non porous solid target surface and treating the target surface either (a) before deposition of the given component to selectively absorb directly or indirectly in the form of a secondary product the given component or a group of components containing the given component or secondary product, or (b) after deposition of the given component to extract other components which have been absorbed at the target surface together with the given component and transferring the enriched given component into the mass spectrometer.

2. A process as claimed in claim 1, wherein the step of treating comprises preparing the target surface with a reagent which selectively fixes the given component directly or as a secondary product.

3. A process as claimed in claim 1 or 2, wherein the step of treating comprises laterally dividing the target surface into zones and preparing the zones with various reagents for fixing various components.

4. A process as claimed in claim 1, wherein the given component is precipitated onto the target surface together with other components and wherein the step of treating comprises thereafter extracting the other components with a solvent.

5. A process as claimed in claim 1, wherein the enriched given component is transferred into a secondary ion mass spectrometer.

6. A process as claimed in claim 1, wherein the enriched given component is transferred into a laser-activated micro-mass analyzer incorporating a time of flight mass spectrometer.

7. A process as claimed in claim 6, wherein the target surface is provided by an organic carrier film and wherein the step of treating comprises forming locally confined deposition of a reagent substance which selectively fixes the given component by locally hydrophilizing the carrier over an area of the same order of magnitude as the laser beam.

8. A process as claimed in claim 7, wherein the carrier film is arranged on the outside of the mass spectrometer under atmospheric pressure and the given component deposited on the film is evaporated into the mass spectrometer through a hole simultaneously formed in the film by the laser.

9. A process as claimed in claim 1, wherein the target surface is provided by a test strip for examining body fluids.

10. A process as claimed in claim 1, wherein the given component is deposited in a first monolayer.

* * * * *